Feb. 22, 1938.    F. A. ISAACSON    2,108,967
BRAKE BEAM SAFETY CARRIER
Filed Nov. 26, 1934
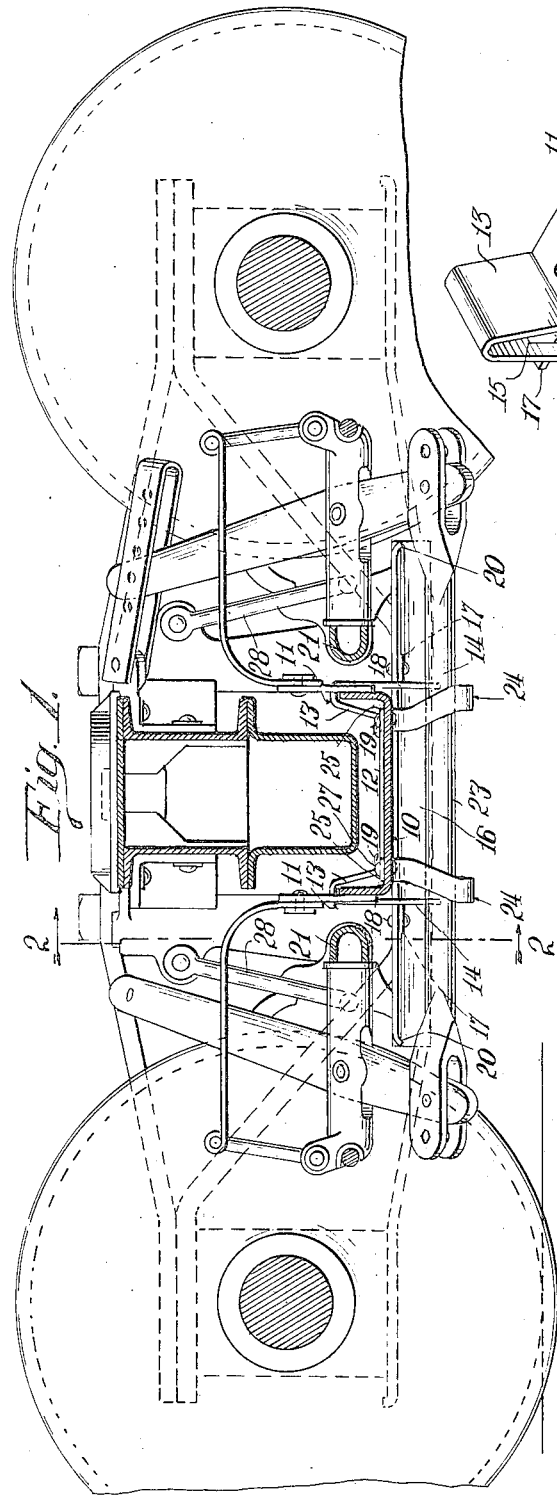
Inventor
Fred A. Isaacson,
By
Attorney Patented Feb. 22, 1938

2,108,967

UNITED STATES PATENT OFFICE 2,108,967

BRAKE BEAM SAFETY CARRIER

Fred A. Isaacson, Topeka, Kans.

Application November 26, 1934, Serial No. 754,829

1 Claim. (Cl. 188—210)

My invention relates to means especially applicable for use on the trucks of freight cars and adapted to be applied to trucks of railroad cars as at present in use; the invention having for its object the provision of means which may be readily applied to the spring plank of the truck and of such construction that the supporting or holding relation between the means and the spring plank and between the means and the elements of the brake mechanism do not entirely depend upon the security of bolts or rivets; the different portions of said means being adapted to have interlocking relation with the spring plank.

The object of my invention is to provide means which will prevent the brake beams and/or the bottom rods from dropping down, in the event the usual supporting elements or pins become loosened or broken and cause derailments or serious damage.

The objects and advantages of my invention will all be readily comprehended from the following detailed description of the accompanying drawing, wherein—

Figure 1 is a side elevation of a car truck, with portions in section, showing the application of my invention.

Figure 2 is a sectional elevation taken substantially on the line 2—2 of Figure 1 looking in the direction of the arrows, with portions of the truck side frame omitted and a portion of the spring plank broken away and shown in section.

Figure 3 is a perspective view of one of the carrier straps, detached from the spring plank.

As an exemplification I have shown my improvements applied to a well known type of freight car truck wherein the usual type of spring plank is shown in section at 10; the plank being the support for the usual coil springs not shown.

Due to the constant jarring and vibrations to which railroad cars, particularly freight cars, are subjected, the hanger attachments of the brake beams and the pivot pins of the bottom rods of the brake mechanism frequently become worn and break, allowing the bottom rods or the brake beams to drop down onto the rails in the paths of the oncoming wheels resulting in serious accidents and damage.

The purpose of my invention is to provide means whereby the possibility of such accidents and the resultant damage will be eliminated.

The brake beam safety carrier portion of my invention comprises a pair of suitable metallic straps 11, 11, which are adapted to extend transversely of the spring plank adjacent opposite ends thereof. The straps are of comparative width and may be made out of a forging, bar iron, casting, aluminum, or spring steel and are preferably made to fit over and straddle the spring plank by having the intermediate portion 12 of the element made to extend substantially parallel with the base of the spring plank, while the ends bend upwardly at 13, 13 and thence across the edges of the side portions of the spring plank and depend therefrom as shown at 14, 14. The ends 14, 14 are made to depend sufficiently beneath the bottom of the spring plank; and these ends are provided with openings 15 adapted to receive the angle bar 16. The upper part of each opening 15 is made larger than the thickness of the upper side of the angle bar by merely cutting the three sides of the opening and thereby providing a tongue or lip which is bent down substantially at right angles to the main portion of ends 14, 14, to form a supporting ledge or shelf as shown at 17; and the openings 15 are extended down at one side of the shelf 17 to receive the vertical side of the angle bar 16. The ledges or shelves 17, 17 are shown bolted and/or riveted to the angle bar as shown at 18 and 18a; while the intermediate portion of the strip is also bolted and/or riveted or otherwise secured to the spring plank as shown at 19.

The angle bar 16, at its ends, preferably the horizontally disposed upper side of the angle, is slit and the slit portion bent downwardly to provide the depending lips 20 which act as stops and prevent the angle bar from moving endwisely out of the strap 11 in the event the bolts or rivets 18 should become loose and drop out. The length of the depending ends of the strap 11 and the positioning of the openings 15 are such that the upper horizontal side of the angle bar 16 will be disposed against the lower face of the spring plank 10, thus holding the angle bar against upward movement in the openings 15, with the result that the depending lips 20, 20 will contact with or abut against the free ends of the ledge forming portions 17 in the event of longitudinal movement of the angle bar because of worn-off or lost bolts or rivets. The ledges or shelves 17 provide a greater bearing area for the angle. In order to permit insertion of the angle bar through the openings in the strap, the lip 20, at one end, is left unbent until the angle is in place; the angle being readily slid out of the way when occasion requires by removing the rivets or bolts 18 and bending one of the lips upwardly into the plane of the upper side of the angle.

The angle 16, which forms a part of the brake beam safety carrier, can be manufactured either of steel casting, aluminum, or spring steel, and may be made in any shape having the required strength and to provide the necessary clearance between the compression members of the brake beams, indicated at 21, 21, in Figure 1.

The angle 16 is of length sufficient to extend somewhat beyond the vertical plane of the brake beams. It is apparent that in the event any of the parts of the brake beam become defective, or the suspension means fail, my improved safety carrier will prevent the brake beam from dropping on the rails and causing an accident or severe damage. The angle is so shaped and applied to the spring plank that the maximum space between the compression member of the brake beam and the safety carrier is provided.

As shown in Figure 2, a similar safety carrier is provided at the other side of the truck in position to carry the other ends of the brake beams; and, in practice, the safety carrier means on one side of the truck is fastened with rivets and on the other side with bolts having common nuts and lock nuts so that the bolts can be removed and the angle moved out of the way for reapplication of the brake beam in the event of a broken brake beam hanger.

At a point in alignment with the bottom or connection rod 23 of the brake mechanism, I provide the spring plank 10 with safety hangers 24, 24, adapted to prevent the bottom rod dropping onto the rails in the event of a lost, broken, or defective bottom rod pin.

These safety hangers are made of bar iron, steel, forging or casting or may be cast steel, malleable iron or aluminum, and are shaped into suitable loop form as shown in Figure 2 so as to provide ample freedom or clearance for the bottom rod 23; and the hangers may have any desired cross sectional area, round, rectangular or square.

The hanger is first formed into the desired shape with the ends straight and arranged parallel with each other. The spring plank 10 is provided with a suitable hole for each hanger; the parallel ends of each hanger are inserted upwardly through a hole in the plank and the ends then spread apart and bent downwardly into parallel relation with the spring plank as shown at 25 in Figure 2; the main portion of the hanger being formed into a loop as shown in Figure 2 so as to entirely encircle the bottom or connection rod 23 of the brake mechanism. The upper part of the loop portion is preferably made straight to extend parallel with the bottom of the spring plank, as shown in Figure 2 at 26; the portions 26 being also arranged parallel with the downwardly bent ends 25, enables a single rivet to be employed whereby the portions 26, spring plank 10 and the downwardly bent ends 25 are all secured together as shown at 27.

It is apparent from the construction that the hanger will remain in position even though the rivets should become loose and drop out, because of the interlocked relation between the ends of the hanger and the spring plank.

The hangers are spaced apart and are preferably formed with the off-set or bend as shown in Figure 1 so as to project outwardly away from the longitudinal center of the spring plank to provide a greater spread or range in catching the bottom rod in case of failure or loss of the pivot pins of the rod.

The failure or loss of the brake beam hangers (shown for example at 28 in Figure 1) or the pivot pins of the connection or bottom rods has permitted a brake beam or a bottom rod to drop down onto the rail, causing derailment and serious damage. With my improvements, however, such failures or losses will not permit the brake beam and/or the connection rod to drop onto the rails; the sagging or dropping brake beam will be carried by the guard or beam member 16 which extends considerably beyond the normal positions of the beams; while the dropping of the bottom rod 23, or of an end thereof, will be impossible because of the spaced apart guard loops or hangers 24, 24; the carriers and hangers having self-sustaining relation with the spring plank whereby their positions will be constantly maintained.

My invention as disclosed in the drawing is thought to be the best embodiment and is expressed in terms used for purposes of description and not as terms of limitation, as structural modifications are possible without departing from the spirit of my invention.

What I claim is:

Safety means of the character described comprising in combination with the spring plank of a railroad car truck, a brake beam carrier consisting of a pair of plank straddling straps arranged transversely of the spring plank and bent so as to provide an intermediate horizontal portion disposed flush with the top face of the plank and upwardly bent portions adapted to straddle the longitudinal edges of the spring plank and to depend therefrom, the depending ends of the straps in a plane beneath the plane of the bottom of the plank being provided with partly severed portions bent outwardly to form integral ledges and thereby provide rectangular slots, and angular bars disposed through the slots of both straps in contact with the bottom of the spring plank and immovably secured to said ledges, the ends of the bars being provided with bent lips.

FRED A. ISAACSON.